US009658815B2

(12) United States Patent
Tsuchida et al.

(10) Patent No.: US 9,658,815 B2
(45) Date of Patent: May 23, 2017

(54) DISPLAY PROCESSING DEVICE AND IMAGING APPARATUS

(71) Applicant: OLYMPUS CORPORATION, Tokyo (JP)

(72) Inventors: Ryusuke Tsuchida, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 213 days.

(21) Appl. No.: 14/690,590

(22) Filed: Apr. 20, 2015

(65) Prior Publication Data

US 2015/0332432 A1 Nov. 19, 2015

(30) Foreign Application Priority Data

May 14, 2014 (JP) ................................ 2014-100683

(51) Int. Cl.
| | |
|---|---|
| G06F 15/16 | (2006.01) |
| G06F 3/14 | (2006.01) |
| G06T 3/40 | (2006.01) |
| G06T 1/60 | (2006.01) |
| G09G 5/12 | (2006.01) |
| H04N 5/04 | (2006.01) |
| G09G 5/397 | (2006.01) |

(52) U.S. Cl.
CPC .............. *G06F 3/1423* (2013.01); *G06T 1/60* (2013.01); *G06T 3/40* (2013.01); *G09G 5/12* (2013.01); *G09G 5/397* (2013.01); *H04N 5/04* (2013.01); *G09G 2340/02* (2013.01); *G09G 2340/0442* (2013.01); *G09G 2350/00* (2013.01); *G09G 2360/06* (2013.01)

(58) Field of Classification Search
None
See application file for complete search history.

(56) References Cited

U.S. PATENT DOCUMENTS

| 6,924,807 B2 * | 8/2005 | Ebihara ................... G09G 5/393 |
| | | 345/503 |
| 2006/0267988 A1 * | 11/2006 | Hussain .................... G06T 1/20 |
| | | 345/502 |

(Continued)

FOREIGN PATENT DOCUMENTS

JP      2006-053527 A       2/2006

*Primary Examiner* — Ryan R Yang
(74) *Attorney, Agent, or Firm* — Westerman, Hattori, Daniels & Adrian, LLP

(57) ABSTRACT

A display processing device includes: a first display processing unit that divides a display image into a first area and a second area and outputs a first output image obtained by performing display processing on display image data of the first area; a second display processing unit that outputs a second output image obtained by performing the display processing on display image data of the second area; a storage unit that temporarily stores the first and second output images; a memory writing control unit that controls writing of the first and second output images to the storage unit; an output selection unit that reads the first and second output images stored in the storage unit and outputs the read first and second output images to a first display device that displays a display image; and a clock control unit that supplies an operation clock to each element.

10 Claims, 5 Drawing Sheets

(56) References Cited

U.S. PATENT DOCUMENTS

2006/0267989 A1* 11/2006 Campbell ................. G06T 1/20
345/502
2010/0253690 A1* 10/2010 Rose ..................... G06F 1/3218
345/502

* cited by examiner

DISPLAY PROCESSING DEVICE AND IMAGING APPARATUS

BACKGROUND OF THE INVENTION

Field of the Invention

The present invention relates to a display processing device and an imaging apparatus.

Priority is claimed on Japanese Patent Application No. 2014-100683, filed May 14, 2014, the content of which is incorporated herein by reference.

Description of Related Art

Imaging apparatuses such as cameras for still images or cameras for moving images generally have a function of displaying captured images on display devices. As the display devices, for example, there are display devices mounted in imaging apparatuses, such as a thin film transistor (TFT) liquid crystal display (LCD) or an electronic view finder (EVF). In addition, there are external display devices (external displays) connected to imaging apparatuses, such as a television (TV), a TFT monitor, or an organic electro luminescence (EL) display. As described above, as the display devices used to display images captured by the imaging apparatuses, there are various types of display devices having different frame rates or resolutions. Therefore, there is a demand for display processing devices provided in the imaging apparatuses and outputting image signals for display on display devices to be able to output image signals to various types of display devices. Furthermore, among the display processing devices, there are display processing devices employing a configuration including a plurality of display processing units in order to be able to simultaneously output image signals to a plurality of display devices.

In recent years, with the high definition of display devices, for example, TVs of a full HD size (1920×1080) (high definition TVs (HDTVs)) with higher definition than conventional TVs of a VGA size (640×480) have become mainstream in the field of TVs. Furthermore, recently, TVs of a 4K2K size (3840×2160) (ultra high definition TVs (UHDTVs)) with further higher definition have been commercialized. Therefore, there is a demand for display processing devices provided in imaging apparatuses to have further high performance.

For example, the case in which a display processing device that outputs an image signal of 60 frames per second (fps) with a full HD-size is adapted to be able to output an image signal of the 4K2K size at the same frame rate (that is, 60 fps) will be considered. In this case, in the 4K2K size, since the number of pixels to be displayed is four times that of the full HD size, a frequency of a clock (an operation clock) by which the display processing device operates is required to be four times that of the full HD size. Therefore, in the display processing device, the frequency of the operation clock becomes high, resulting in an increase in power consumption. Furthermore, in the development of the display processing device, since the display processing device is adapted to handle the high frequency of the operation clock, it is difficult to optimize operation timings of respective elements of the display processing device, that is, circuits for realizing the functions of the display processing device, and thus it is not easy to develop the display processing device.

For example, Japanese Unexamined Patent Application, First Publication No. 2006-053527 discloses a technology of a display processing device in which an entire area of an image of one frame is divided into a plurality of areas and the divided areas are processed in a parallel manner. In the technology disclosed in Japanese Unexamined Patent Application. First Publication No. 2006-053527, two display processing units are provided in the display processing device, an image area of one frame to be displayed is divided into right and left areas, and the respective display processing units process the left half image and the right half image in a parallel manner. In the technology disclosed in Japanese Unexamined Patent Application. First Publication No. 2006-053527, image signals processed by the respective display processing units are input in a parallel manner to a display device capable of receiving two image signals in a parallel manner, so that the entire image of one frame is displayed.

As described above, in the technology disclosed in Japanese Unexamined Patent Application, First Publication No. 2006-053527, the image area of one frame is divided into a plurality of areas to limit an increase in image areas to be processed by the respective display processing units, and the plurality of display processing units corresponding to the respective areas perform processing on the respective corresponding image areas in a parallel manner, so that a high definition image is displayed on a display device.

As the point of view of the technology disclosed in Japanese Unexamined Patent Application, First Publication No. 2006-053527 is used, a display processing device that outputs an image signal of the full HD size can be adapted to be able to output an image signal of the 4K2K size. In more detail, two display processing units corresponding to the full HD size are provided in the display processing device, an image of the 4K2K size is divided into two right and left images, and the respective display processing units process the left half image and the right half image in a parallel manner. In this way, the area of the images processed by the respective display processing units can be reduced to ½, and the frequency of an operation clock of the respective display processing units is increased twofold, so that it is possible to realize a display processing device that outputs an image signal of the 4K2K size.

SUMMARY OF THE INVENTION

According to a first aspect of the present invention, a display processing device that performs predetermined display processing on image data of a display image of a predetermined first size input to the display processing device, includes: a first display processing unit that divides a display image of a second size larger than the first size into a first area and a second area and outputs image data of a first output image obtained by performing the display processing on display image data of the first area, when the display image of the second size is input to the first display processing unit; a second display processing unit that outputs image data of a second output image obtained by performing the display processing on display image data of the second area; a storage unit that temporarily stores the image data of the first output image and the image data of the second output image; a memory writing control unit that controls writing of the image data of the first output image and the image data of the second output image to the storage unit; an output selection unit that reads the image data of the first output image and the image data of the second output image stored in the storage unit, and outputs the image data of the first output image and the image data of the second output image to a first display device that displays the display image of the second size; and a clock control unit that generates and supplies an operation clock required when the first display processing unit, the second display processing unit, and the memory writing control unit operate.

According to a second aspect of the present invention, in the display processing device according to the first aspect, the first display processing unit may acquire the display image data of the first area by a direct memory access (DMA) and notify the second display processing unit of a timing at which the display image data of the second area is acquired by the DMA.

According to a third aspect of the present invention, in the display processing device according to the first aspect or the second aspect, the first display processing unit may include: a first synchronization signal generation block that generates and outputs a synchronization signal required when the first display device displays an image corresponding to output image data output from the output selection unit, and generates and outputs a first trigger signal representing a first timing at which acquisition of the display image data of the first area by the DMA is started and a second trigger signal representing a second timing at which acquisition of the display image data of the second area by the DMA is started, on the basis of the operation clock supplied from the clock control unit; a first input control block that acquires the display image data of the first area by the DMA in response to the first trigger signal; and a first display processing block that outputs the image data of the first output image obtained by performing the display processing on the display image data of the first area acquired by the first input control block. The second display processing unit may include: a second synchronization signal generation block that generates and outputs a synchronization signal required when a second display device, which is handled by the second display processing unit independently, displays an image corresponding to output image data output from the second display processing unit, and generates and outputs a third trigger signal representing a third timing at which acquisition of the image data of the display image of the first size, which is handled by the second display processing unit independently, by the DMA is started, on the basis of the operation clock supplied from the clock control unit; a synchronization signal selection block that selects any one of the second trigger signal and the third trigger signal and outputs the selected trigger signal as a fourth trigger signal; a second input control block that acquires the display image data of the second area or the image data of the display image of the first size, which is handled by the second display processing unit independently, by the DMA in response to the fourth trigger signal; and a second display processing block that outputs the display image data of the second area acquired by the second input control block, or the image data of the second output image obtained by performing the display processing on the image data of the display image of the first size, which is handled by the second display processing unit independently.

According to a fourth aspect of the present invention, in the display processing device according to the third aspect, the storage unit may include a first storage area that stores the image data of the first output image and a second storage area that stores the image data of the second output image. The memory writing control unit may control writing to the first storage area of the image data of the first output image and writing to the second storage area of the image data of the second output image output by the second display processing unit when the second trigger signal is selected, on the basis of the synchronization signal output by the first display processing unit and corresponding to the first display device.

According to a fifth aspect of the present invention, in the display processing device according to the third aspect or the fourth aspect, on the basis of the synchronization signal output by the first display processing unit and corresponding to the first display device, the output selection unit may read the image data of the first output image stored in the storage unit and subsequently read the image data of the second output image, and output the read image data to the first display device.

According to a sixth aspect of the present invention, in the display processing device according to the third aspect or the fourth aspect, on the basis of the synchronization signal output by the first display processing unit and corresponding to the first display device, the output selection unit may simultaneously read the image data of the first output image stored in the storage unit and the image data of the second output image, and output the read image data to each corresponding input system provided in the first display device.

According to a seventh aspect of the present invention, in the display processing device according to any one of the first aspect to the sixth aspect, the clock control unit may generate a clock of a frequency required when the first display device displays an image corresponding to one pixel, and generate the operation clock on the basis of the generated clock.

According to an eighth aspect of the present invention, in the display processing device according to any one of the first aspect to the seventh aspect, the storage unit may be a line memory including a storage area that stores image data corresponding to one row of the display image of the second size.

According to a ninth aspect of the present invention, in the display processing device according to any one of the first aspect to the eighth aspect, the first area may be a left half area of the display image of the second size. The second area may be a right half area of the display image of the second size. The first display processing unit may output the image data of the first output image obtained by performing the display processing on display image data of the left half area. The second display processing unit may output the image data of the second output image obtained by performing the display processing on display image data of the right half area.

According to a tenth aspect of the present invention, an imaging apparatus may include the display processing device according to any one of the first aspect to the ninth aspect.

DETAILED DESCRIPTION OF THE INVENTION

Figure 1:
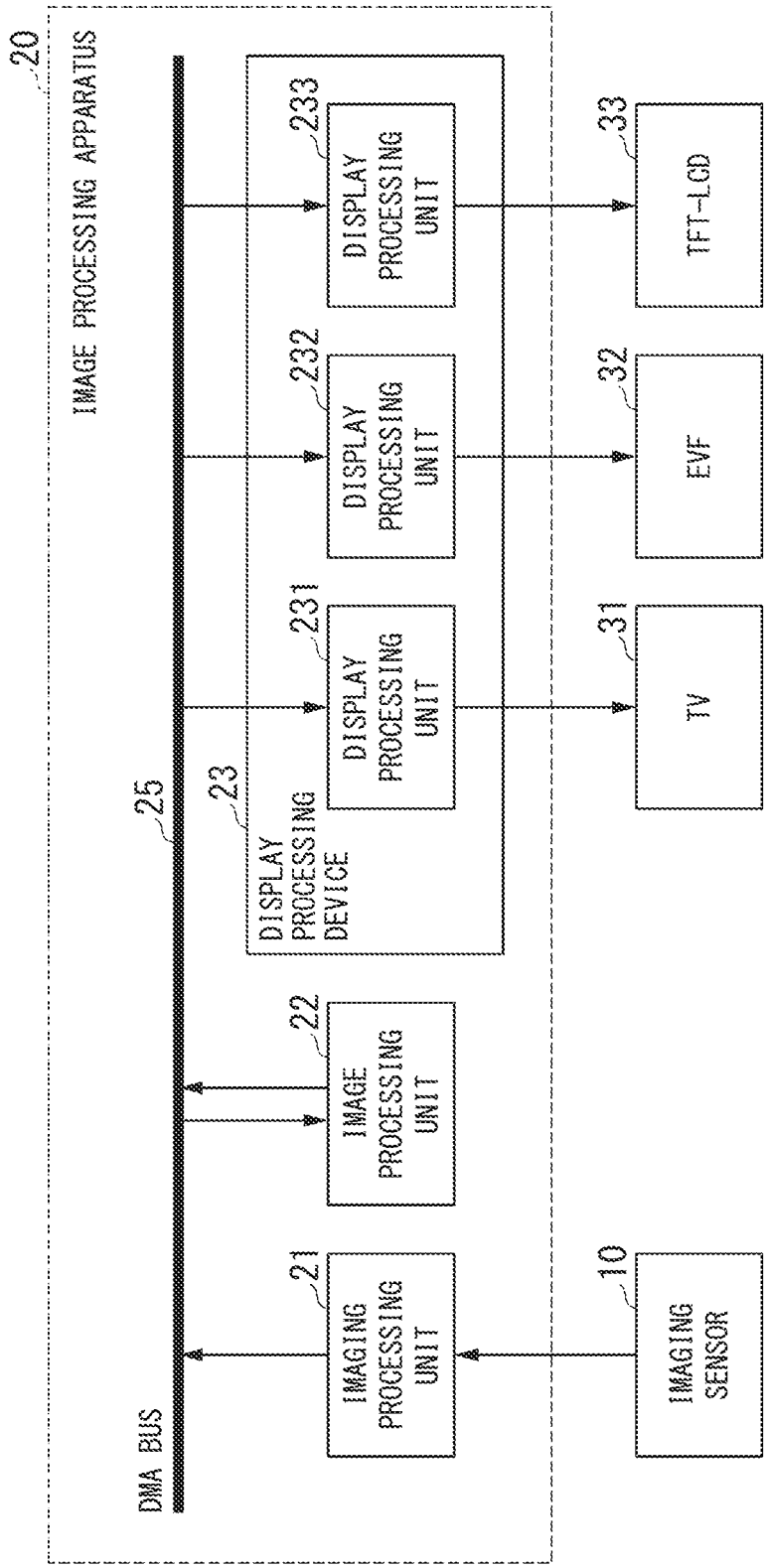
FIG. 1 is a block diagram showing an example of a configuration of a system provided with a display processing device according to an embodiment of the present invention.

Hereinafter, an embodiment of the present invention will be described with reference to the accompanying drawings. FIG. 1 is a block diagram showing an example of a configuration of a system provided with a display processing device according to an embodiment of the present invention. In addition, there is no limitation on the configuration of a system to which the display processing device according to the present embodiment is applied. FIG. 1 shows a configuration in which the display processing device according to the present embodiment is applied to a system of an imaging apparatus.

A system of an imaging apparatus 1 shown in FIG. 1 includes an imaging sensor 10, an image processing apparatus 20, a television (TV) 31, an EVF 32, and a TFT liquid crystal display (TFT-LCD) 33. The imaging apparatus 1 causes an image captured by the imaging sensor 10 to be displayed on connected display devices (the TV 31, the EVF 32, and the TFT-LCD 33).

The imaging sensor 10 is an image sensor represented as a charge coupled device (CCD) image sensor or a complementary metal-oxide semiconductor (CMOS) image sensor, which photoelectrically converts an optical image of an object which is formed by a lens (not shown). The imaging sensor 10 outputs a pixel signal corresponding to object light to the image processing apparatus 20.

The image processing apparatus 20 performs predetermined image processing on the pixel signal input from the imaging sensor 10. The image processing apparatus 20 performs display processing for the connected TV 31, EVF 32, and TFT-LCD 33 on an image subjected to the image processing, and causes the image to be displayed. The image processing apparatus 20 includes an imaging processing unit 21, an image processing unit 22, and a display processing device 23. Furthermore, in the image processing apparatus 20, the imaging processing unit 21, the image processing unit 22, and the display processing device 23 are connected to one another via a direct memory access (DMA) bus 25. Each of the imaging processing unit 21, the image processing unit 22, and the display processing device 23 performs data writing or data reading to a memory for temporary storage, such as a dynamic random access memory (DRAM, not shown) provided outside the image processing apparatus 20 and connected to the DMA bus 25, by DMA. That is, each of the imaging processing unit 21, the image processing unit 22, and the display processing device 23 in the image processing apparatus 20 exchanges image data to be processed among the elements thereof via the external DRAM (not shown) connected to the DMA bus 25.

The imaging processing unit 21 performs pre-processing such as flaw correction or shading correction on the image corresponding to the pixel signal input from the imaging sensor 10, and transmits (writes) image data (hereinafter referred to as "pre-processed image data") of the pre-processing result to (in) the DRAM (not shown) by the DMA.

The image processing unit 22 acquires (reads) the pre-processed image data recorded in the DRAM (not shown) by the DMA, performs various types of image processing such as noise elimination, YC conversion processing, and resize processing, and generates image data for display (hereinafter referred to as "display image data"). Then, the image processing unit 22 transmits (writes) the generated display image data to (in) the DRAM (not shown) by the DMA.

In addition, in the imaging apparatus 1, the image processing unit 22 can generate image data for recording by performing various types of image processing of JPEG compression processing, moving image compression processing such as MPEG compression processing and H.264 compression processing, and the like, on the pre-processed image data, and record the generated image data for recording on a recording medium (for example, an SD memory card, a Compact Flash (CF: registered trademark), and the like) detachable from the imaging apparatus 1. Also at this time, the image data for recording generated by the image processing unit 22 is recorded on the recording medium via the DRAM (not shown). Therefore, in the imaging apparatus 1, there are cases in which the image data for recording recorded on the recording medium is read and is transmitted (written) to (in) the DRAM (not shown). In this case, the image processing unit 22 can acquire (read) the image data for recording recorded on the DRAM (not shown) by the DMA, generate display image data by performing various types of image processing of JPEG expansion processing, moving image expansion processing such as MPEG expansion processing and H.264 expansion processing, and the like, and transmit (write) the generated display image data to (in) the DRAM (not shown) by the DMA again.

The display processing device 23 acquires (reads) the display image data recorded on the DRAM (not shown) by the DMA, and performs display processing, such as processing of superimposing data for on-screen display (OSD) display and color conversion processing corresponding to a connected display device, on the acquired display image data. Then, the display processing device 23 outputs the display-processed display image data (hereinafter referred to as "output image data") to display devices such as the TV 31, the EVF 32, and the TFT-LCD 33.

In addition, the display processing device 23 according to the present embodiment may be embedded in the image processing apparatus 20 mounted in the imaging apparatus 1 as shown in FIG. 1. However, for example, the display processing device 23 may also be independently mounted in the imaging apparatus 1.

The display processing device 23 includes three display processing units 231 to 233. In the following description, when the display processing units 231 to 233 are not distinguished from one another, they are called "display processing units 230."

Each of the display processing units 231 to 233 acquires (reads) display image data to be displayed on a connected display device from the DRAM (not shown) by the DMA, and performs display processing on the acquired display image data. Then, each of the display processing units 231 to 233 outputs the display-processed output image data to the connected display device. In the system of the imaging apparatus 1 shown in FIG. 1, the TV 31 is connected to the display processing unit 231, the EVF 32 is connected to the display processing unit 232, and the TFT-LCD 33 is connected to the display processing unit 233. In addition, each of the display processing units 231 to 233 has the same configuration. That is, each of the display processing units 231 to 233 can cause all connected display devices to display an image regardless of the type of the display processing unit 230.

In addition, the configuration and the operation of each of the display processing device 23 and the display processing unit 230 according to the present embodiment will be described in detail later.

The TV 31 is a TV that displays an image of a full HD size (1920×1080) (high definition TV (HDTV)). The TV 31 displays an image corresponding to the display-processed output image data output from the display processing unit 231. In addition, in FIG. 1, the TV 31 is also an element of the imaging apparatus 1; however, the TV 31 is detachable from the imaging apparatus 1.

The EVF 32, for example, is a small display device such as a TFT-LCD or an organic electro luminescence (EL) display. The EVF 32 displays an image corresponding to the display-processed output image data output from the display processing unit 232. The EVF 32 operates as a view finder mounted in the imaging apparatus 1 in order to check an image captured by the imaging sensor 10.

The TFT-LCD 33 is a medium-sized display device. The TFT-LCD 33 displays an image corresponding to the display-processed output image data output from the display processing unit 233. In addition, in FIG. 1, the TFT-LCD 33 is also an element of the imaging apparatus 1; however, the TFT-LCD 33 is detachable from the imaging apparatus 1.

With such a configuration, the imaging apparatus 1 can display images captured by the imaging sensor 10 on a plurality of display devices. That is, the imaging apparatus 1 can simultaneously display images corresponding to display-processed output image data on display devices equal in number to the display processing units 230 in the display processing device 23 provided in the image processing apparatus 20.

Furthermore, for example, a display device having a large number of pixels to be displayed, such as a TV that displays an image of a 4K2K size (3840×2160) (ultra high definition TV (UHDTV)), can be connected to the imaging apparatus 1. That is, a display device having a greater number of pixels than that handled by the respective display processing units 230 in the display processing device 23 can be connected to the imaging apparatus 1. In this case, a plurality of display processing units 230 operate in cooperation with one another in a parallel manner, so that the imaging apparatus 1 causes an image corresponding to display-processed output image data to be displayed on a display device that displays an image having a large number of pixels. When the plurality of display processing units 230 operate in cooperation with one another in a parallel manner, an exclusive relation is established between the output of display-processed output image data to display devices which are connected to the respective display processing units 230 and through which the respective display processing units 230 can independently display images, and the output of display-processed output image data to the display devices which are connected to the respective display processing units 230 and through which the respective display processing units 230 can display images by operating in cooperation with one another in a parallel manner.

Figure 2:
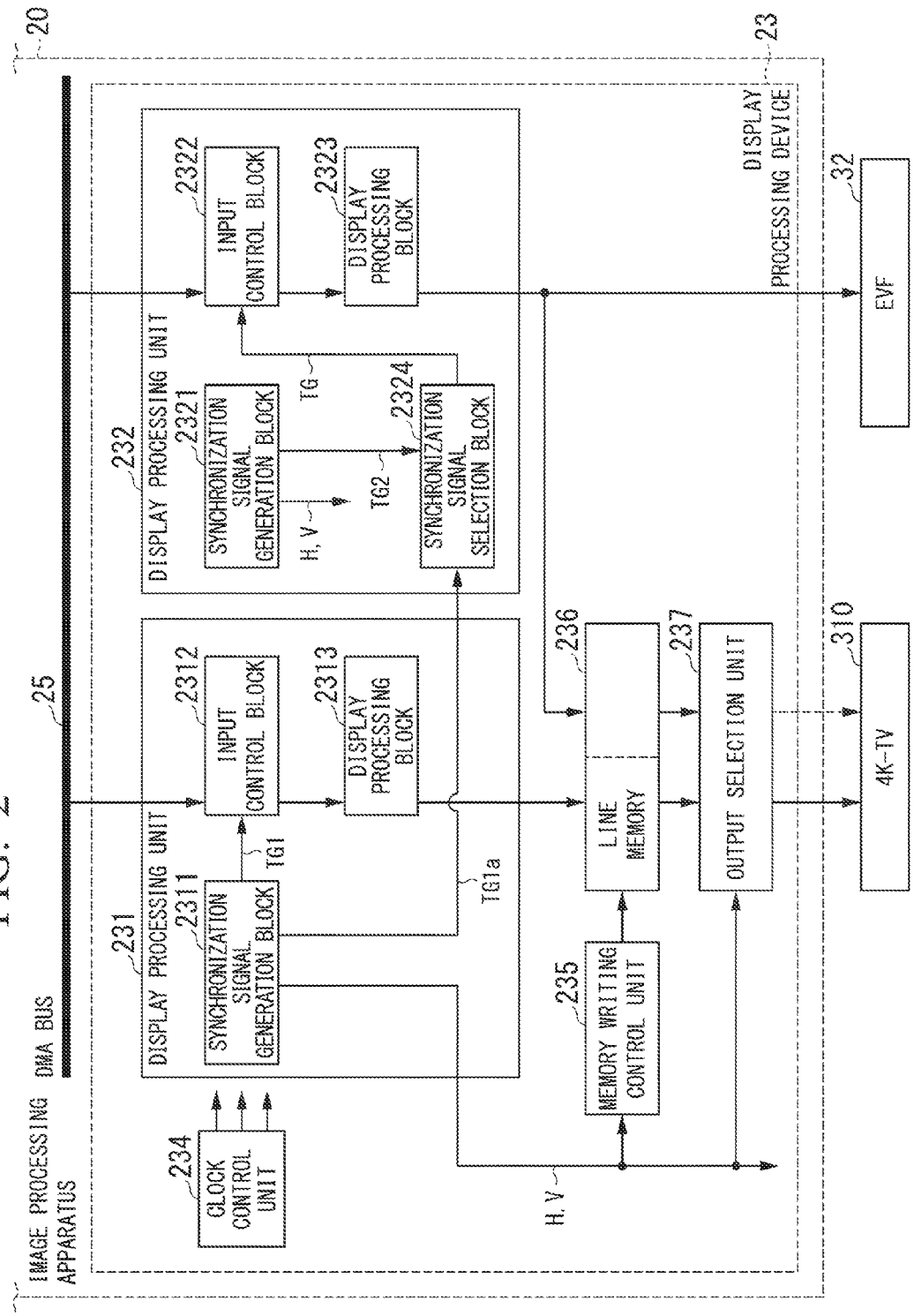
FIG. 2 is a block diagram showing a schematic configuration of the display processing device according to the present embodiment.

Next, the configuration and the operation of the display processing device 23 according to the present embodiment will be described. FIG. 2 is a block diagram showing a schematic configuration of the display processing device 23 according to the present embodiment. The following description will be provided for the configuration and the operation in which the two display processing units 231 and 232 corresponding to display devices that displays an image of a full HD size (1920×1080) are provided in the display processing device 23 included in the image processing apparatus 20, and the display processing units 231 and 232 output image data in cooperation with each other to display devices that displays an image of a 4K2K size (3840×2160).

The display processing device 23 shown in FIG. 2 includes the display processing unit 231, the display processing unit 232, a clock control unit 234, a memory writing control unit 235, a line memory (a storage unit) 236, and an output selection unit 237. A 4K TV (4K-TV) 310, which displays the image of the 4K2K size (3840×2160) and through which the display processing unit 231 and the display processing unit 232 display images in cooperation with each other, and the EVF 32, through which the display processing unit 232 independently displays images, are connected to the display processing device 23.

The 4K-TV 310 is a TV that displays the image of the 4K2K size (3840×2160). The 4K-TV 310 displays an image corresponding to the display-processed output image data output from the display processing device 23. In addition, the 4K-TV 310 is detachable from the imaging apparatus 1.

The display processing unit 231 and the display processing unit 232 sequentially acquire (read) display image data of respective frames to be displayed on connected display devices from the DRAM (not shown) connected to the DMA bus 25 by the DMA. Then, the display processing unit 231 and the display processing unit 232 sequentially output image data obtained by performing display processing on the sequentially acquired display image data to the connected display devices. At this time, each of the display processing unit 231 and the display processing unit 232 sequentially acquires (reads) the display image data of the respective frames to be displayed on the display devices from the DRAM (not shown) by the DMA in each row (line), and sequentially outputs the output image data obtained by performing the display processing on the display image data acquired in each line to the connected display devices.

In the display processing device 23 shown in FIG. 2, as described above, the display processing unit 231 and the display processing unit 232 perform the display processing on display image data to be displayed on the 4K-TV 310 in cooperation with each other in a parallel manner. In more detail, after an area of the display image data to be displayed on the 4K-TV 310 is divided into two areas, the display processing unit 231 performs the display processing on the display image data of one of the divided areas, and the display processing unit 232 performs the display processing on the display image data of the other divided area. In greater detail, after the area of the display image data of one frame to be displayed on the 4K-TV 310 is divided into two areas in a horizontal direction, that is, right and left areas, the display processing unit 231 performs the display processing on the display image data of the left half area, and the display processing unit 232 performs the display processing on the display image data of the right half area.

The display processing unit 231 includes a synchronization signal generation block 2311, an input control block 2312, and a display processing block 2313. Furthermore, the display processing unit 232 includes a synchronization signal generation block 2321, an input control block 2322, a display processing block 2323, and a synchronization signal selection block 2324.

The synchronization signal generation block 2311 generates, for example, a synchronization signal, such as a vertical synchronization signal V or a horizontal synchronization signal H, which represents the timing at which an image corresponding to output image data is displayed on the display device connected to the display processing unit 231, on the basis of an operation clock supplied from the clock control unit 234. Then, the synchronization signal generation block 2311 outputs the generated synchronization signal to the display device connected to the display processing unit 231. Furthermore, the synchronization signal generation block 2311 outputs the generated synchronization signal to the memory writing control unit 235 and the output selection unit 237.

Furthermore, on the basis of the generated synchronization signal, the synchronization signal generation block 2311 generates a trigger signal TG1, which represents the timing at which display image data of one frame to be displayed on the display device connected to the display processing unit 231 is acquired from the DRAM (not shown) and display processing is started, that is, the start timing of the DMA, and outputs the generated trigger signal TG1 to the input control block 2312. The trigger signal TG1 represents the timing at which the acquisition of display image data corresponding to an initial pixel (that is, a left upper pixel of an image) in the display image data of one frame from the DRAM (not shown) is started.

Furthermore, on the basis of the generated synchronization signal, the synchronization signal generation block 2311 generates a trigger signal TG1a, which represents the timing at which the other display processing unit 230 operating in cooperation acquires corresponding display image data from the DRAM (not shown) and starts the display processing, that is, the start timing of the DMA, and outputs the generated trigger signal TG1a to a synchronization signal selection block in the other display processing unit 230. In the configuration shown in FIG. 2, the synchronization signal generation block 2311 outputs the trigger signal TG1a, which is used when the display processing unit 232 acquires corresponding display image data, to the synchronization signal selection block 2324 in the display processing unit 232. The output timing of the trigger signal TG1a represents the timing at which the other display processing unit 230 operating in cooperation starts to acquire display image data corresponding to an initial pixel in an area of the corresponding display image data from the DRAM (not shown).

In addition, when the display processing unit 231 and the display processing unit 232 operate in cooperation with each other in a parallel manner, each of the display processing unit 231 and the display processing unit 232 may also acquire display image data to be subjected to the display processing at the same time. Therefore, the trigger signal TG1 and the trigger signal TG1a generated by the synchronization signal generation block 2311 may be trigger signals representing the same timing.

The input control block 2312 starts the DMA, by which the display processing unit 231 acquires display image data to be subjected to the display processing, in response to the trigger signal TG1 input from the synchronization signal generation block 2311. Then, the input control block 2312 outputs the display image data acquired (read) from the DRAM (not shown) by the DMA to the display processing block 2313 from a predetermined timing.

In addition, when the display processing unit 231 and the display processing unit 232 perform the display processing on the display image data to be displayed on the 4K-TV 310 in cooperation with each other, the input control block 2312 acquires (reads) display image data of a left half area thereinafter referred to as "left side display image data") in the display image data to be displayed on the 4K-TV 310 from the DRAM (not shown), and outputs the left side display image data to the display processing block 2313. In addition, the adjustment of the timing, which is performed in order to output the display image data acquired by the input control block 2312 to the display processing block 2313 from a predetermined timing, is, for example, performed by a buffer section provided in the input control block 2312.

The display processing block 2313 outputs output image data obtained by performing the display processing on the display image data input from the input control block 2312 to the line memory 236. In addition, when the display processing unit 231 and the display processing unit 232 perform the display processing on the display image data to be displayed on the 4K-TV 310 in cooperation with each other the display processing block 2313 outputs the output image data obtained by performing the display processing on the left side image data input from the input control block 2312, to the line memory 236.

Similarly to the synchronization signal generation block 2311 in the display processing unit 231, the synchronization signal generation block 2321 generates a synchronization signal (for example, a vertical synchronization signal V or a horizontal synchronization signal Hi), which represents the timing at which an image corresponding to output image data is displayed on the display device connected to the display processing unit 232, on the basis of the operation clock supplied from the clock control unit 234. Then, the synchronization signal generation block 2321 outputs the generated synchronization signal to the display device connected to the display processing unit 232.

Furthermore, similarly to the synchronization signal generation block 2311 in the display processing unit 231, on the basis of the generated synchronization signal, the synchronization signal generation block 2321 generates a trigger signal TG2, which represents the timing at which display image data of one frame to be displayed on the display device connected to the display processing unit 232 is acquired from the DRAM (not shown) and the display processing is started, that is, the start timing of the DMA, and outputs the generated trigger signal TG2 to the synchronization signal selection block 2324. The trigger signal TG2, for example, represents the timing at which the acquisition of display image data corresponding to an initial pixel (that is, an upper left pixel of an image) in display image data of one frame to be output to the EVF 32 connected to the display processing unit 232 from the DRAM (not shown) is started.

The synchronization signal selection block 2324 selects any one trigger signal of the trigger signal TG2 input from the synchronization signal generation block 2321 and the trigger signal TG1a input from the synchronization signal generation block 2311 in the display processing unit 231, and outputs the selected trigger signal TG to the input control block 2322.

In addition, when the display processing unit 232 independently causes an image to be displayed on the connected EVF 32, the synchronization signal selection block 2324 outputs the trigger signal TG2 input from the synchronization signal generation block 2321 to the input control block 2322 as the trigger signal TG. Furthermore, when the display processing unit 231 and the display processing unit 232 cause the image to be displayed on the 4K-TV 310 in cooperation with each other, the synchronization signal selection block 2324 outputs the trigger signal TG1a input from the synchronization signal generation block 2311 in the display processing unit 231 to the input control block 2322 as the trigger signal TG.

Similarly to the input control block 2312 in the display processing unit 231, the input control block 2322 starts the DMA, by which the display processing unit 232 acquires display image data to be subjected to the display processing, in response to the trigger signal TG input from the synchronization signal selection block 2324. Then, the input control block 2322 outputs the display image data acquired (read)

from the DRAM (not shown) by the DMA to the display processing block 2323 from a predetermined timing.

In addition, when the display processing unit 232 independently performs the display processing on the display image data to be displayed on the EVF 32, the input control block 2322 acquires (reads) the display image data to be displayed on the EVF 32 (hereinafter referred to as "EVF display image data") from the DRAM (not shown), and outputs the EVF display image data to the display processing block 2323. Furthermore, when the display processing unit 231 and the display processing unit 232 perform the display processing on the display image data to be displayed on the 4K-TV 310 in cooperation with each other, the input control block 2322 acquires (reads) display image data of a right half area (hereinafter referred to as "right side display image data") in the display image data to be displayed on the 4K-TV 310 from the DRAM (not shown), and outputs the right side display image data to the display processing block 2323.

In addition, similarly to the input control block 2312 in the display processing unit 231, the adjustment of the timing, which is performed in order to output the display image data acquired by the input control block 2322 to the display processing block 2323 from a predetermined timing, is, for example, performed by a buffer section provided in the input control block 2322. The start timing of outputting the display image data acquired by the input control block 2312 to the display processing block 2313 is equal to the start timing of outputting the display image data acquired by the input control block 2322 to the display processing block 2323. Therefore, when the display processing unit 231 and the display processing unit 232 perform the display processing on the display image data to be displayed on the 4K-TV 310 in cooperation with each other, the start timing of the display processing by the display processing block 2313 is equal to the start timing of the display processing by the display processing block 2323. In this way, the display processing unit 231 and the display processing unit 232 can simultaneously perform the display processing on input display image data, and output image data from the same timing. That is, the display processing unit 231 and the display processing unit 232 can output, at the same timing, the output image data obtained by performing the display processing on the left side display image data and the output image data obtained by performing the display processing on the right side display image data.

Similarly to the display processing block 2313 in the display processing unit 231, the display processing block 2323 outputs output image data obtained by performing the display processing on the display image data input from the input control block 2322. At this time, when the display processing unit 232 independently performs the display processing on the EVF display image data to be displayed on the EVF 32, the display processing block 2323 outputs output image data obtained by performing the display processing on the EVF display image data input from the input control block 2322 to the EVF 32. Furthermore, when the display processing unit 231 and the display processing unit 232 perform the display processing on the display image data to be displayed on the 4K-TV 310 in cooperation with each other, the display processing block 2323 outputs output image data obtained by performing the display processing on the right side display image data input from the input control block 2322, to the line memory 236.

The memory writing control unit 235 controls the storage (writing) of the output image data to the line memory 236 on the basis of the synchronization signal (for example, the vertical synchronization signal V or the horizontal synchronization signal H) input from the synchronization signal generation block 2311.

In addition, when the display processing unit 231 and the display processing unit 232 cause an image to be displayed on the 4K-TV 310 in cooperation with each other, the memory writing control unit 235 controls the storage (writing) of the output image data to the line memory 236. In more detail, the memory writing control unit 235 controls the line memory 236 to store (write) the output image data output from the display processing block 2313 in the display processing unit 231 and the output image data output from the display processing block 2323 in the display processing unit 232 in a storage area corresponding to the line memory 236 at the timing based on the synchronization signal. In this way, the output image data obtained by performing the display processing on the left side display image data by the display processing block 2313 is stored in a storage area corresponding to the left side of the image in the line memory 236, and the output image data obtained by performing the display processing on the right side display image data by the display processing block 2323 is stored in a storage area corresponding to the right side of the image in the line memory 236.

Furthermore, in the case in which the display processing unit 231 and the display processing unit 232 do not operate in cooperation with each other such as the case in which the TV 31 used to display an image by only the display processing unit 231 is connected to the display processing device 23, the memory writing control unit 235 controls the line memory 236 to output the output image data input to the line memory 236 from the display processing block 2313 in the display processing unit 231 to the output selection unit 237 without storing the output image data.

The line memory 236, for example, includes a memory, such as a static random access memory (SRAM), which has a storage area for temporarily storing output image data corresponding to one row (line) (that is, 3840 pieces of output image data) displayed on the 4K-TV 310 connected to the display processing device 23. In addition, the line memory 236 includes a divided storage area (hereinafter referred to as a "left side storage area") corresponding to the output image data output from the display processing block 2313 in the display processing unit 231, and a divided storage area (hereinafter referred to as a "right side storage area") corresponding to the output image data output from the display processing block 2323 in the display processing unit 232.

Under the control of the memory writing control unit 235, the line memory 236 temporarily stores display-processed output image data obtained by performing the display processing on the left side display image data input from the display processing block 2313 in the display processing unit 231, and display-processed output image data obtained by performing the display processing on the right side display image data input from the display processing block 2323 in the display processing unit 232. Furthermore, under the control of the output selection unit 237, the line memory 236 outputs the stored output image data to the output selection unit 237.

In addition, in the system of the imaging apparatus 1 in which the 4K-TV 310 is assumed to be connected to the display processing device 23, since it is sufficient if the line memory 236 has a storage area for temporarily storing at least 3840 pieces of output image data, for example, it is assumed that an SRAM or the like having a storage area capable of temporarily storing 4096 pieces of output image data is mounted. However, the line memory 236 can be configured to have many more storage areas.

Furthermore, it is assumed that the control of storage (writing) of the output image data by the memory writing control unit 235 and the control of reading of the output image data by the output selection unit 237 are performed at the same time in the line memory 236. Therefore, the line memory 236 is configured to prevent next output image data from being stored (written) by the memory writing control unit 235 before the stored output image data is read by the output selection unit 237, that is, to prevent the next output image data from being overwritten. As a configuration for preventing the overwriting, for example, it is considered that the line memory 236 is configured to have storage areas corresponding to two lines, and the control of storage (writing) of the display-processed output image data by the memory writing control unit 235 and the control of reading of the display-processed output image data by the output selection unit 237 are switched in each line, i.e., a so-called a double buffer configuration is employed. However, in the display processing device 23 according to the present embodiment, the configuration for preventing the overwriting of the line memory 236 is not particularly specified. That is, an existing technology for preventing the overwriting can be applied to the line memory 236.

The output selection unit 237 controls the reading of the output image data stored in the line memory 236 and the output of the read output image data to the connected display device, on the basis of the synchronization signal (for example, the vertical synchronization signal V or the horizontal synchronization signal H) input from the synchronization signal generation block 2311.

In addition, when the display processing unit 231 and the display processing unit 232 cause an image to be displayed on the 4K-TV 310 in cooperation with each other, the output selection unit 237 controls the reading of the output image data stored in the line memory 236 and the output of the read output image data to the connected 4K-TV 310. In more detail, the output selection unit 237 controls the line memory 236 such that both the output image data subjected to the display processing by the display processing block 2313 in the display processing unit 231 and the output image data subjected to the display processing by the display processing block 2323 in the display processing unit 232 are read from corresponding storage areas of the line memory 236 at the timing based on the synchronization signal. In this way, both the output image data obtained by performing the display processing on the left side display image data stored in the storage area corresponding to the left side of an image (the left side storage area) in the line memory 236 and the output image data obtained by performing the display processing on the right side display image data stored in the storage area corresponding to the right side of the image (the right side storage area) in the line memory 236 are sequentially read from the line memory 236 in each line. Then, the output selection unit 237 sequentially outputs the read output image data to the 4K-TV 310 in each line. In this way, the 4K-TV 310 displays one image corresponding to the output image data obtained by combining display-processed output image data corresponding to the left side display image data with display-processed output image data corresponding to the right side display image data, that is, the output image data obtained by performing the display processing on the display image data to be displayed on the 4K-TV 310.

Furthermore, in the case in which the display processing unit 231 and the display processing unit 232 do not operate in cooperation with each other such as the case in which the TV 31 used to display an image by only the display processing unit 231 is connected to the display processing device 23, the output selection unit 237 does not read the output image data stored in the line memory 236, and outputs the output image data, which is subjected to the display processing by the display processing block 2313 in the display processing unit 231 and output through the line memory 236 directly, to the connected TV 31. In this way, the TV 31 displays an image corresponding to the display-processed output image data output from the display processing block 2313 in the display processing unit 231.

The clock control unit 234 generates a clock with a frequency suitable when the respective elements provided in the display processing device 23 (the display processing unit 231, the display processing unit 232, the memory writing control unit 235, and the output selection unit 237) operate, and supplies the generated clock to the respective elements.

In more detail, the clock control unit 234 generates a clock (hereinafter referred to as a "display device clock") when the display device connected to the display processing device 23 displays an image corresponding to the display-processed output image data. In this case, the frequency of the display device clock generated by the clock control unit 234, for example, indicates a cycle (a frequency) required when the display device connected to the display processing device 23 displays an image corresponding to one pixel. The display device clock corresponds to a so-called pixel clock.

For example, when the TV 31 that displays the image of the full HD size (1920×1080) is connected to the display processing device 23, the clock control unit 234 generates a display device clock with a frequency required in order to display respective pixels of the image to be displayed on the TV 31. Furthermore, when the EVF 32 is connected to the display processing device 23, the clock control unit 234 generates a display device clock with a frequency required when the EVF 32 displays respective pixels of an image corresponding to the EVF display image data. Furthermore, when the 4K-TV 310 that displays the image of the 4K2K size (3840×2160) is connected to the display processing device 23, the clock control unit 234 generates a display device clock with a frequency required in order to display respective pixels of the image to be displayed on the 4K-TV 310, that is, a display device clock with a frequency four times that of the display device clock generated when the TV 31 is connected to the display processing device 23.

Then, on the basis of the generated display device clock, the clock control unit 234 generates an operation clock for operating the respective elements, and supplies the generated operation clock to the respective elements. For example, when the display processing unit 231 independently causes an image to be displayed on the TV 31 and the display processing unit 232 independently causes an image to be displayed on the EVF 32, the clock control unit 234 generates a display device clock corresponding to the TV 31 and a display device clock corresponding to the EVF 32. Then, the clock control unit 234 supplies an operation clock generated on the basis of the display device clock corresponding to the TV 31 to the display processing unit 231 and supplies an operation clock generated on the basis of the display device clock corresponding to the EVF 32 to the display processing unit 232. In addition, the respective display device clocks may also be employed as the respective operation clocks.

In addition, when the 4K-TV 310 is connected to the display processing device 23, the clock control unit 234 generates the display device clock with the frequency four times that of the display device clock corresponding to the TV 31 as described above. However, in the display processing device 23, the display processing unit 231 and the display processing unit 232 perform the display processing on the display image data to be displayed on the 4K-TV 310 in cooperation with each other. That is, as described above, in the display processing device 23, each of the display processing unit 231 and the display processing unit 232 performs the display processing on the display image data of any one of the two areas obtained by dividing the area of the display image data to be displayed on the 4K-TV 310. That is, the number of the display image data to be subjected to the display processing by each of the display processing unit 231 and the display processing unit 232 is ½. Therefore, each of the display processing unit 231 and the display processing unit 232 can complete an operation at the same cycle even in the case of an operation clock with a frequency corresponding to ½ of the frequency of the display device clock with the frequency four times that of the display device clock corresponding to the TV 31, that is, an operation clock with a frequency two times that of the display device clock corresponding to the TV 31. Consequently, the clock control unit 234 supplies the operation clock with the frequency two times that of the display device clock corresponding to the TV 31 to each of the display processing unit 231 and the display processing unit 232.

With such a configuration, in the display processing device 23 according to the present embodiment, even when a display device that displays an image with higher definition than an image with a size handled by the display processing unit 230 provided in the display processing device 23 is connected, a plurality of display processing units 230 operate in cooperation with one another in a parallel manner, thereby handling the display device that displays a high definition image in the state in which the frequency of the operation clock of each display processing unit 230 is suppressed. Furthermore, in the display processing device 23 according to the present embodiment, the frequency of the operation clock of each display processing unit 230 is suppressed, so that it is also possible to limit an increase in the power consumption of the display processing device 23 itself according to the present embodiment.

Next, an operation in which the display processing device 23 according to the present embodiment divides and processes an image will be described. The following description will be provided for an example of an operation in which the display processing device 23 divides an area of display image data into two areas and two display processing units 230 perform the display processing on the display image data of the divided areas in cooperation with each other in a parallel manner.

Figure 3:
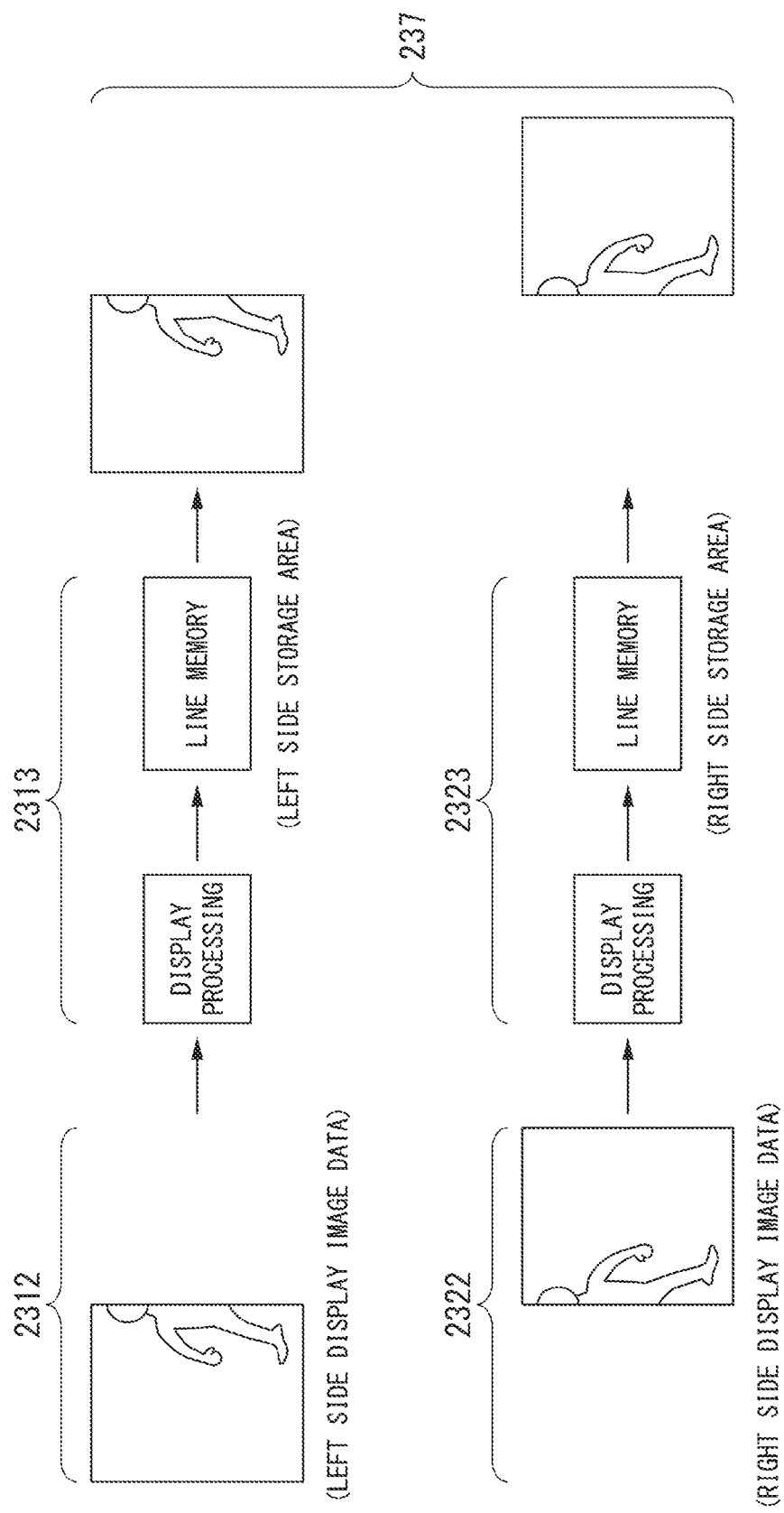
FIG. 3 is a diagram schematically showing an example of the case of dividing and processing an image in the display processing device according to the present embodiment.

First, the entire flow of the operation in which the display processing device 23 according to the present embodiment divides and processes an image will be described. FIG. 3 is a diagram schematically showing an example of the case of dividing and processing an image in the display processing device 23 according to the present embodiment.

As described above, when the display processing device 23 divides the area of the display image data into two areas and performs the display processing, the display processing unit 231 and the display processing unit 232 cooperate with each other in such a manner that the display processing unit 231 performs the display processing on the left side display image data of the left half area and the display processing unit 232 performs the display processing on the right side display image data of the right half area. An upper part of FIG. 3 shows the processing on the left side display image data and a lower part of FIG. 3 shows the processing on the right side display image data.

As shown in the upper part of FIG. 3, in the display processing unit 231, the input control block 2312 acquires (reads) the left side display image data from the DRAM (not shown) by the DMA, and outputs the left side display image data to the display processing block 2313. Then, the display processing block 2313 performs the display processing on the left side display image data input from the input control block 2312, and outputs display-processed output image data to the left side storage area of the line memory 236.

Furthermore, as shown in the lower part of FIG. 3, in the display processing unit 232, the input control block 2322 acquires (reads) the right side display image data from the DRAM (not shown) by the DMA, and outputs the right side display image data to the display processing block 2323. Then, the display processing block 2323 performs the display processing on the right side display image data input from the input control block 2322, and outputs display-processed output image data to the right side storage area of the line memory 236.

Then, the memory writing control unit 235 stores both the output image data corresponding to the left side display image data output from the display processing unit 231 and the output image data corresponding to the right side display image data output from the display processing unit 232 in corresponding storage areas of the line memory 236.

After the display processing corresponding to one line of the display image data is completed, the output selection unit 237 sequentially reads output image data corresponding to one line from the line memory 236, and sequentially outputs the output image data to the display device connected to the display processing device 23 at the timing corresponding to the synchronization signal (for example, the vertical synchronization signal V or the horizontal synchronization signal H) input from the synchronization signal generation block 2311.

As described above, in the display processing device 23, two display processing units 230 perform the display processing in cooperation with each other in a parallel manner, so that it is possible to perform the display processing on an image with a size on which each display processing unit 230 is not able to independently perform the display processing. At this time, in the display processing device 23, each of the two display processing units 230 operating in cooperation with each other performs the display processing on display image data of any one of the two areas obtained by dividing the area of the display image data, so that it is possible to perform the display processing in a state in which the frequency of the operation clock of each display processing unit 230 is suppressed.

Next, a description will be provided for operations of respective elements corresponding to the number of image signal input systems provided in the display device connected to the display processing device 23 when the display processing device 23 according to the present embodiment divides and processes an image. In addition, the following description will be provided for an operation when the 4K-TV 310 that, displays the image of the 4K2K size (3840×2160) is connected to the display processing device 23 including the two display processing units 231 and 232 corresponding to the TV 31 that displays the image of the full HD size (1920×1080) as shown in FIG. 2, and the display processing unit 231 and the display processing unit 232 output the display-processed output image data to the 4K-TV 310 in cooperation with each other.

<First Operation>

Figure 4:
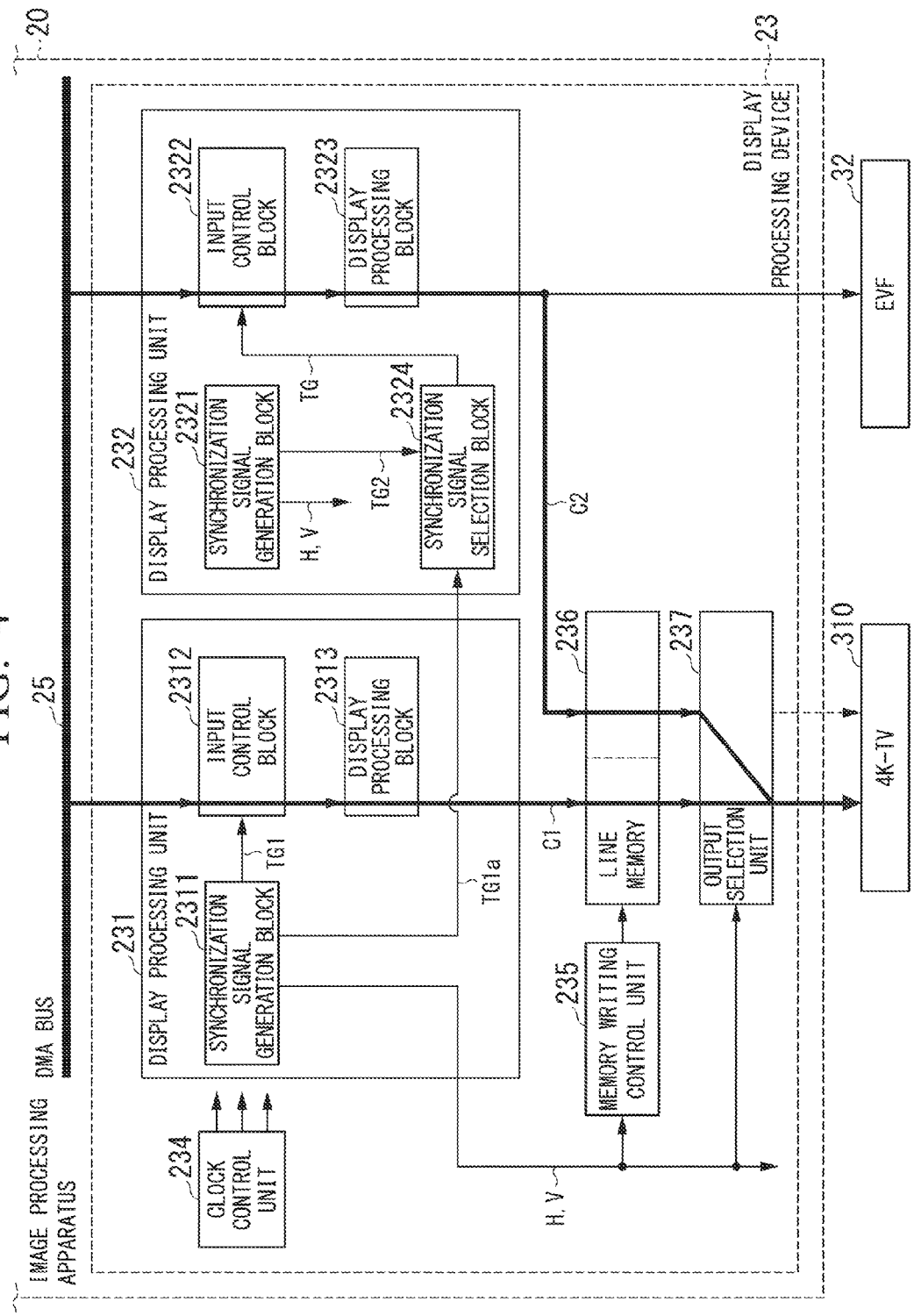
FIG. 4 is a diagram showing an example of a first operation of processing an image in the display processing device according to the present embodiment.

FIG. 4 is a diagram showing an example of the first operation in which the display processing device 23 according to the present embodiment processes an image. The example of the operation shown in FIG. 4 indicates an operation when the display-processed output image data of the 4K2K size (3840×2160), on which the display processing unit 231 and the display processing unit 232 have performed the display processing in cooperation with each other, is output to the 4K-TV 310 including one image signal input system. FIG. 4 shows respective image data paths in the first operation on the block diagram of the display processing device 23.

In the first operation, the clock control unit 234 generates a display device clock used to display an image on the 4K-TV 310 connected to the display processing device 23. In this case, the frequency of the display device clock generated by the clock control unit 234 is four times the frequency of the display device clock generated when the TV 31 is connected to the display processing device 23. Then, the clock control unit 234 supplies the generated display device clock to the output selection unit 237.

Furthermore, on the basis of the generated display device clock, the clock control unit 234 generates an operation clock with a frequency corresponding to ½ of the frequency of the display device clock. Then, the clock control unit 234 supplies the generated operation clock to the display processing unit 231, the display processing unit 232, and the memory writing control unit 235.

Then, the synchronization signal generation block 2311 in the display processing unit 231 generates a vertical synchronization signal V and a horizontal synchronization signal H used to display an image corresponding to display-processed output image data on the 4K-TV 310, on the basis of the operation clock supplied from the clock control unit 234. Then, the synchronization signal generation block 2311 outputs the generated vertical synchronization signal V and horizontal synchronization signal Hi to the memory writing control unit 235, the output selection unit 237, and the 4K-TV 310.

Thereafter, the synchronization signal generation block 2311 outputs the trigger signal TG1 to the input control block 2312 at the timing at which the vertical synchronization signal V represents the display timing of an image of one frame on the 4K-TV 310 and then the horizontal synchronization signal H represents the start of an immediately preceding horizontal period representing a horizontal period in which output image data is output, that is, at the timing representing the start of the final horizontal period in a vertical blanking period. In this way, in response to the trigger signal TG1 input from the synchronization signal generation block 2311, the input control block 2312 starts DMA for acquiring the pixel data of the left side display image data from the first line of display image data of one frame, on which the display processing unit 231 performs the display processing (refer to the image data path C1 in FIG. 4).

Furthermore, the synchronization signal generation block 2311 outputs the trigger signal TG1a having the same timing as the trigger signal TG1 to the synchronization signal selection block 2324 in the display processing unit 232. Then, the synchronization signal selection block 2324 outputs the trigger signal TG1a input from the synchronization signal generation block 2311 to the input control block 2322 as the trigger signal TG. In this way, in response to the trigger signal TG input from the synchronization signal selection block 2324, the input control block 2322 starts DMA for acquiring the pixel data of the right side display image data from the first line of the display image data of one frame, on which the display processing unit 232 performs the display processing (refer to the image data path C2 in FIG. 4).

As described above, each of the input control block 2312 in the display processing unit 231 and the input control block 2322 in the display processing unit 232 acquires display image data of a corresponding area from the DRAM (not shown) by the DMA.

Then, the input control block 2312 outputs the pixel data of the left side display image data acquired from the DRAM (not shown) by the DMA, to the display processing block 2313 (refer to the image data path C1 in FIG. 4). In this way, the display processing block 2313 outputs output image data obtained by performing the display processing on the pixel data of the left side display image data input from the input control block 2312, to the line memory 236 (refer to the image data path C1 in FIG. 4), Furthermore, the input control block 2322 outputs the pixel data of the right side display image data acquired from the DRAM (not shown) by the DMA, to the display processing block 2323 (refer to the image data path C2 in FIG. 4). In this way, the display processing block 2323 outputs output image data obtained by performing the display processing on the pixel data of the right side display image data input from the input control block 2322, to the line memory 236 (refer to the image data path C2 in FIG. 4).

Then, the memory writing control unit 235 starts to control the storage (writing) of the output image data to the line memory 236 from the timing at which the vertical synchronization signal V input from the synchronization signal generation block 2311 in the display processing unit 231 represents the display timing of the image of one frame on the 4K-TV 310 and then the horizontal synchronization signal H represents the start of the immediately preceding horizontal period representing the horizontal period in which the output image data is output, that is, from the timing representing the start of the final horizontal period in the vertical blanking period. In addition, in relation to the control of the storage (writing) of the output image data to the line memory 236 by the memory writing control unit 235, a delay time from when each of the display processing unit 231 and the display processing unit 232 acquires the display image data until each of the display processing unit 231 and the display processing unit 232 outputs the display-processed output image data is considered. That is, in the horizontal period in which the control of the storage of the output image data to the line memory 236 has started, the memory writing control unit 235 starts the storage (writing) to the line memory 236 of the display-processed output image data output by each of the display processing unit 231 and the display processing unit 232 from the timing after each of the display processing unit 231 and the display processing unit 232 has waited for a period corresponding to the number of clocks required to perform the display processing on the display image data.

In this way, the output image data obtained by performing the display processing on the left side display image data output from the display processing block 2313 in the display processing unit 231 is stored in the left side storage area of the line memory 236, and the output image data obtained by performing the display processing on the right side display image data output from the display processing block 2323 in the display processing unit 232 is stored in the right side storage area of the line memory 236.

Thereafter, the output selection unit 237 starts the control of reading of the display-processed output image data stored in the line memory 236 from the timing at which the vertical synchronization signal V input from the synchronization signal generation block 2311 in the display processing unit 231 represents the display timing of the image of one frame on the 4K-TV 310, and the horizontal synchronization signal H represents the start of the horizontal period in which the output image data is output, that is, represents the timing of the first line of the image of one frame to be displayed on the 4K-TV 310, and then image data of an initial pixel is output. At this time, the output selection unit 237 performs the reading of the display-processed output image data stored in the line memory 236 with the display device clock input from the synchronization signal generation block 2311 in the display processing unit 231. Then, the output selection unit 237 sequentially outputs the read display-processed output image data to the 4K-TV 310 at the timing of the display device clock, that is, at the timing at which the 4K-TV 310 displays the image.

In the control of the reading of the output image data stored in the line memory 236 by the output selection unit 237, the output image data for the left side display image data stored in the left side storage area of the line memory 236 is sequentially read at the timing of the display device clock in accordance with the timing of the initial pixel in the first line of one frame to be output to the 4K-TV 310, that is, the timing of the initial pixel of the left half area of one frame to be displayed on the 4K-TV 310 (refer to the image data path C1 in FIG. 4). Then, the output selection unit 237 sequentially outputs the read output image data for the left side display image data to the 4K-TV 310 at the timing of the display device clock from the timing of the initial pixel of the left half area of one frame to be displayed on the 4K-TV 310 (refer to the image data path C1 in FIG. 4). Thereafter, the output selection unit 237 sequentially reads the output image data for the right side display image data stored in the right side storage area of the line memory 236 at the timing of the display device clock in accordance with the timing of a pixel of a center right side in the first line of one frame to be output to the 4K-TV 310, that is, the timing of the initial pixel of the right half area of one frame to be displayed on the 4K-TV 310 (refer to the image data path C2 in FIG. 4). Then, the output selection unit 237 sequentially outputs the read output image data for the right side display image data to the 4K-TV 310 at the timing of the display device clock from the timing of the initial pixel of the right half area of one frame to be displayed on the 4K-TV 310 (refer to the image data path C2 in FIG. 4).

In this way, an image corresponding to the output image data of the first line of one frame output from the output selection unit 237 is displayed on the 4K-TV 310.

Furthermore, after the acquisition of the left side display image data of the first line of the display image data of one frame by the DMA ends, the input control block 2312 subsequently starts the DMA for acquiring the left side display image data of the second line of the display image data of one frame (refer to the image data path C1 in FIG. 4). Then, the input control block 2312 outputs the pixel data of the left side display image data acquired from the DRAM (not shown) by the DMA, to the display processing block 2313 (refer to the image data path C in FIG. 4). Furthermore, after the acquisition of the right side display image data of the first line of the display image data of one frame by the DMA ends, the input control block 2322 subsequently starts the DMA for acquiring the right side display image data of the second line of the display image data of one frame (refer to the image data path C2 in FIG. 4). Then, the input control block 2322 outputs the pixel data of the right side display image data acquired from the DRAM (not shown) by the DMA, to the display processing block 2323 (refer to the image data path C2 in FIG. 4).

As described above, each of the input control block 2312 and the input control block 2322 sequentially acquires display image data of a corresponding area from the DRAM (not shown) by the DMA in each line, and sequentially outputs the acquired display image data to the corresponding display processing block 2313 or display processing block 2323 in each line. In this way, each of the display processing block 2313 and the display processing block 2323 performs the display processing on the display image data of the corresponding area input from the corresponding input control block 2312 or input control block 2322, and sequentially outputs the display-processed output image data to the line memory 236 in each line of the display image data.

Then, the memory writing control unit 235 sequentially stores the output image data in the left side storage area and the right side storage area of the line memory 236 in each line of the display image data from the timing at which the horizontal synchronization signal H input from the synchronization signal generation block 2311 in the display processing unit 231 represents the start of a next horizontal period in which the output image data is output, that is, the timing of the first line of the image of one frame to be displayed on the 4K-TV 310. In this way, the output image data obtained by performing the display processing on the left side display image data and the output image data obtained by performing the display processing on the right side display image data are sequentially stored in the left side storage area and the right side storage area of the line memory 236 in each line of the display image data, respectively.

Thereafter, the output selection unit 237 reads the display-processed output image data stored in the line memory 236 in response to the display device clock in accordance with the timing at which the horizontal synchronization signal H input from the synchronization signal generation block 2311 in the display processing unit 231 represents the start of the next horizontal period in which the output image data is output, that is, the timing of the second line of the image of one frame to be displayed on the 4K-TV 310. Then, the output selection unit 237 sequentially outputs the read display-processed output image data to the 4K-TV 310 at the timing at which the 4K-TV 310 displays an image, that is, at the timing of the display device clock.

In this way, output image data of the first line and subsequent lines of one frame is sequentially output from the output selection unit 237 to the 4K-TV 310, so that an image corresponding to the output image data of the first line and subsequent lines of one frame output from the output selection unit 237 is displayed on the 4K-TV 310.

As described above, in the first operation, the two display processing units 231 and 232 provided in the display processing device 23 and handling the display image data of the full HD size (1920×1080) perform the display processing for the left side display image data and the display processing for the right side display image data in cooperation with each other in a parallel manner, thereby performing the display processing for the display image data of the 4K2K size (3840>2160). Then, the output selection unit 237 provided in the display processing device 23 outputs the display-processed output image data of the 4K2K size (3840×2160) to the 4K-TV 310 connected to the display processing device 23, at the timing of the display device clock used to display the image of the 4K2K size (3840×2160).

At this time, each of the display processing unit 231 and the display processing unit 232 operates with an operation clock of a frequency corresponding to ½ of that of the display device clock used to display the image of the 4K2K size (3840×2160). Furthermore, the output selection unit 237 operates with the display device clock used to display the image of the 4K2K size (3840×2160). In this way, in the display processing device 23, the frequency of the display device clock for outputting the output image data to the 4K-TV 310 is four times the frequency of the display device clock of the TV 31 that displays the image of the full HD size (1920×1080), in response to the frequency of a clock required when the connected 4K-TV 310 displays an image corresponding to one pixel; however, the display processing on the display image data of the 4K2K size (3840×2160) can be performed using a frequency corresponding to ½ of the frequency of the display device clock of the 4K-TV 310. That is, the display processing unit 231, the display processing unit 232, the line memory 236, and the memory writing control unit 235 provided in the display processing device 23 can operate with the frequency corresponding to ½ of the frequency of the display device clock. In this way, in the display processing device 23, by the first operation, in the state in which the frequency of the operation clock is suppressed, it is possible to perform display processing on an image with higher definition than the image with a size handled by each of the display processing unit 231 and the display processing unit 232 provided in the display processing device 23.

<Second Operation>

Figure 5:
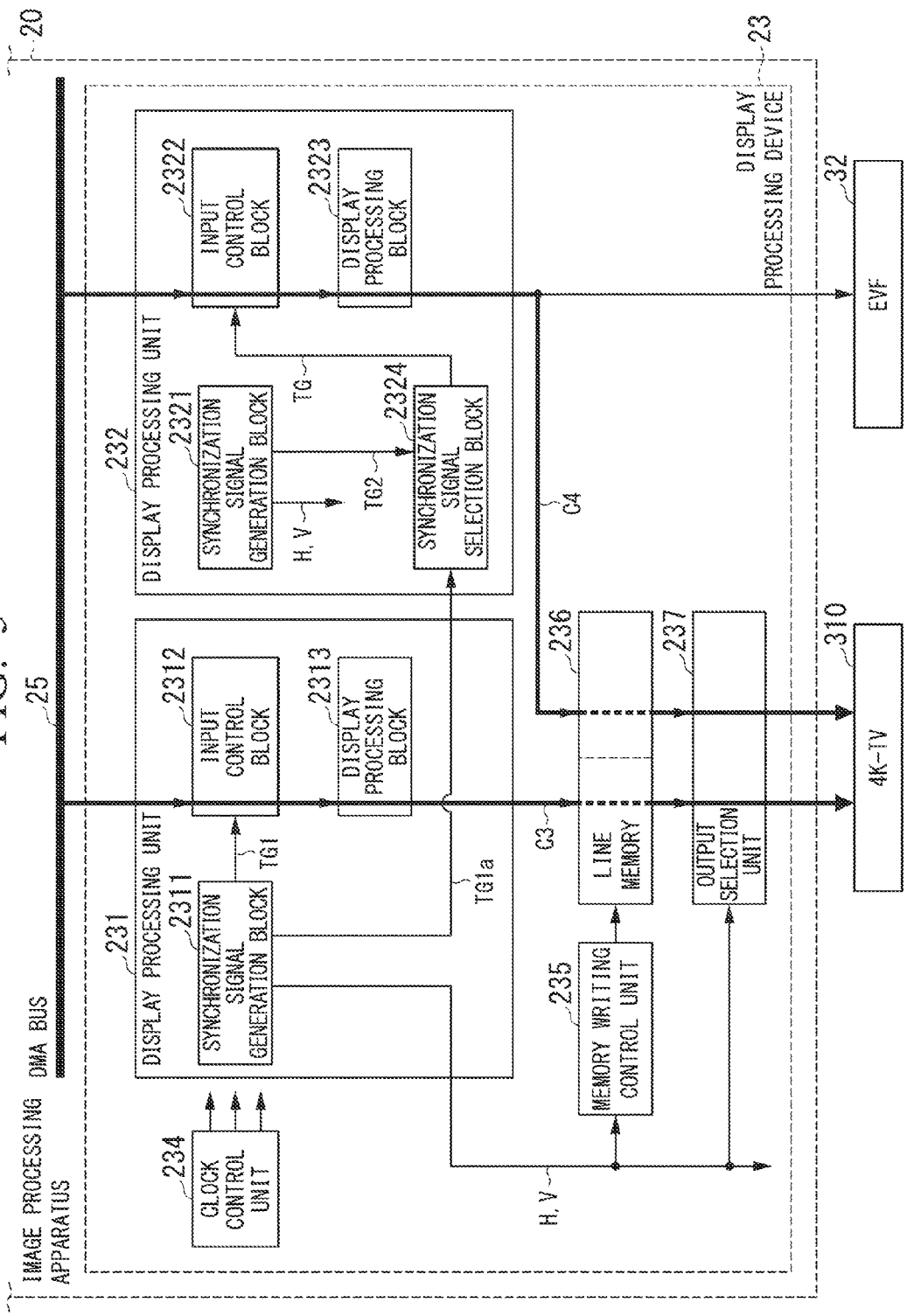
FIG. 5 is a diagram showing an example of a second operation of processing an image in the display processing device according to the present embodiment.

FIG. 5 is a diagram showing an example of the second operation in which the display processing device 23 according to the present embodiment processes an image. The example of the operation shown in FIG. 5 indicates an operation when the display-processed output image data of the 4K2K size (3840×2160), on which the display processing unit 231 and the display processing unit 232 have performed the display processing in cooperation with each other, is output to the 4K-TV 310 including two image signal input systems. FIG. 5 shows respective image data paths in the second operation on the block diagram of the display processing device 23.

In the second operation, similarly to the first operation, the clock control unit 234 generates the display device clock used to display an image on the 4K-TV 310 connected to the display processing device 23, that is, the clock with the frequency four times the frequency of the display device clock generated when the TV 31 is connected to the display processing device 23.

Furthermore, similarly to the first operation, on the basis of the generated display device clock, the clock control unit 234 generates the operation clock with the frequency corresponding to ½ of the frequency of the display device clock, and supplies the generated operation clock to the display processing unit 231, the display processing unit 232, and the memory writing control unit 235. In the second operation, the clock control unit 234 also supplies the generated operation clock to the output selection unit 237.

Then, similarly to the first operation, the synchronization signal generation block 2311 in the display processing unit 231 generates the vertical synchronization signal V and the horizontal synchronization signal H used to display the display-processed output image data on the 4K-TV 310, on the basis of the operation clock supplied from the clock control unit 234, and outputs the generated vertical synchronization signal V and horizontal synchronization signal H to the memory writing control unit 235, the output selection unit 237, and the 4K-TV 310.

Thereafter, the synchronization signal generation block 2311 outputs the trigger signal TG1 to the input control block 2312 at the same timing as that in the first operation. In this way, similarly to the first operation, in response to the trigger signal TG1 input from the synchronization signal generation block 2311, the input control block 2312 starts the DMA for acquiring the pixel data of the left side display image data from the first line of the display image data of one frame, on which the display processing unit 231 performs the display processing (refer to the image data path C3 in FIG. 5).

Furthermore, similarly to the first operation, the synchronization signal generation block 2311 outputs the trigger signal TG1a having the same timing as that of the trigger signal TG1 to the synchronization signal selection block 2324 in the display processing unit 232. The synchronization signal selection block 2324 outputs the trigger signal TG1a input from the synchronization signal generation block 2311 in the display processing unit 231 to the input control block 2322 as the trigger signal TG. In this way, similarly to the first operation, in response to the trigger signal TG input from the synchronization signal selection block 2324, the input control block 2322 starts the DMA for acquiring the pixel data of the right side display image data from the first line of the display image data of one frame, on which the display processing unit 232 performs the display processing (refer to the image data path C4 in FIG. 5).

As described above, in the second operation, similarly to the first operation, each of the input control block 2312 in the display processing unit 231 and the input control block 2322 in the display processing unit 232 acquires the display image data of a corresponding area from the DRAM (not shown) by the DMA.

Then, similarly to the first operation, the input control block 2312 outputs the pixel data of the left side display image data acquired from the DRAM (not shown) by the DMA, to the display processing block 2313. The display processing block 2313 outputs the output image data obtained by performing the display processing on the pixel data of the left side display image data input from the input control block 2312, to the line memory 236 (refer to the image data path C3 in FIG. 5). Furthermore, similarly to the first operation, the input control block 2322 outputs the pixel data of the right side display image data acquired from the DRAM (not shown) by the DMA, to the display processing block 2323. The display processing block 2323 outputs the output image data obtained by performing the display processing on the pixel data of the right side display image data input from the input control block 2322, to the line memory 236 (refer to the image data path C4 in FIG. 5).

Then, the memory writing control unit 235 starts the control of the storage (writing) of the output image data to the line memory 236 from the same timing as that in the first operation. In this way, similarly to the first operation, the output image data obtained by performing the display processing on the left side display image data output from the display processing block 2313 in the display processing unit 231 is stored in the left side storage area of the line memory 236, and the output image data obtained by performing the display processing on the right side display image data output from the display processing block 2323 in the display processing unit 232 is stored in the right side storage area of the line memory 236.

Thereafter, the output selection unit 237 starts the control of reading of the display-processed output image data stored in the line memory 236 from the same timing as that in the first operation. At this time, the output selection unit 237 simultaneously reads the output image data obtained by performing the display processing on the left side display image data stored in the left side storage area of the line memory 236, and the output image data obtained by performing the display processing on the right side display image data stored in the right side storage area of the line memory 236, at the operation clock input from the synchronization signal generation block 2311 in the display processing unit 231. Then, the output selection unit 237 sequentially outputs the simultaneously read display-processed output image data to the 4K-TV 310 at the timing of the operation clock that is, at the timing of a frequency corresponding to ½ of the frequency of the display device clock with which the 4K-TV 310 displays an image.

In the control of the reading of the output image data stored in the line memory 236 by the output selection unit 237, the output image data for the left side display image data stored in the left side storage area of the line memory 236 is sequentially read at the timing of the operation clock in accordance with the timing of the initial pixel in the first line of one frame to be output to the 4K-TV 310, that is, the timing of the initial pixel of the left half area of one frame to be displayed on the 4K-TV 310 (refer to the image data path C3 in FIG. 5). Then, the output selection unit 237 sequentially outputs the read output image data for the left side display image data to the 4K-TV 310 at the timing of the operation clock from the timing of the initial pixel of the left half area of one frame to be displayed on the 4K-TV 310 (refer to the image data path C3 in FIG. 5). Furthermore, the output selection unit 237 sequentially reads the output image data for the right side display image data stored in the right side storage area of the line memory 236 at the timing of the operation clock from the same timing in accordance with the timing of the initial pixel in the first line of one frame to be output to the 4K-TV 310, that is, the timing of the initial pixel of the left half area of one frame to be displayed on the 4K-TV 310 (refer to the image data path C4 in FIG. 5). Then, the output selection unit 237 sequentially outputs the read output image data for the right side display image data to the 4K-TV 310 at the timing of the operation clock from the same timing as that of the initial pixel of the left half area of one frame to be displayed on the 4K-TV 310 (refer to the image data path C4 in FIG. 5).

In this way, the output image data corresponding to the left half area in the first line of the image of one fame to be displayed on the 4K-TV 310 and the output image data corresponding to the right half area in the first line of the image of the same one frame to be displayed on the 4K-TV 310 are simultaneously output from the output selection unit 237 to one of the image signal input systems provided in the 4K-TV 310 (refer to the image data path C3 in FIG. 5) and to the other of the image signal input systems provided in the 4K-TV 310 (refer to the image data path C4 in FIG. 5), respectively. Then, an image corresponding to the output image data of the first line of one frame output to each input system from the output selection unit 237 is displayed on the 4K-TV 310.

Furthermore, similarly to the first operation, after the acquisition of the left side display image data of the first line of the display image data of one frame by the DMA ends, the input control block 2312 subsequently starts the DMA for acquiring the left side display image data of the second line of the display image data of one frame, and outputs the pixel data of the left side display image data acquired from the DRAM (not shown) by the DMA to the display processing block 2313 (refer to the image data path C3 in FIG. 5). Furthermore, similarly to the first operation, after the acquisition of the right side display image data of the first line of the display image data of one frame by the DMA ends, the input control block 2322 subsequently starts the DMA for acquiring the right side display image data of the second line of the display image data of one frame, and outputs each pixel data of the right side display image data acquired from the DRAM (not shown) by the DMA, to the display processing block 2323 (refer to the image data path C4 in FIG. 5).

As described above, in the second operation, similarly to the first operation, each of the input control block 2312 and the input control block 2322 sequentially acquires display image data of the corresponding area from the DRAM (not shown) by the DMA in each line, and sequentially outputs the acquired display image data to a corresponding display processing block 2313 or display processing block 2323 in each line. In this way, similarly to the first operation, each of the display processing block 2313 and the display processing block 2323 performs the display processing on the display image data of the corresponding area input from the corresponding input control block 2312 or input control block 2322, and sequentially outputs the display-processed output image data to the line memory 236 in each line of the display image data.

Then, the memory writing control unit 235 sequentially stores the output image data in the left side storage area and the right side storage area of the line memory 236 in each line of the display image data from the same timing as that in the first operation. In this way, similarly to the first operation, the output image data obtained by performing the display processing on the left side display image data and the output image data obtained by performing the display processing on the right side display image data are sequentially stored in the left side storage area and the right side storage area of the line memory 236 in each line of the display image data, respectively.

Thereafter, the output selection unit 237 simultaneously reads the display-processed output image data for the left side display image data stored in the left side storage area of the line memory 236 and the display-processed output image data for the right side display image data stored in the right side storage area of the line memory 236 from the same timing as that in the first operation in response to the operation clock. Then, the output selection unit 237 sequentially outputs the simultaneously read output image data to the 4K-TV 310 at the timing of the frequency corresponding to ½ of the frequency of the display device clock with which the 4K-TV 310 displays an image, that is, the timing of the operation clock.

In this way, output image data corresponding to a left half area in the first line and subsequent lines of the image of one frame to be displayed on the 4K-TV 310 and output image data corresponding to a right half area are simultaneously output to respective input systems provided in the 4K-TV 310 and corresponding to an image signal from the output selection unit 237 in a sequential manner. Then, an image corresponding to the output image data of the first line and subsequent lines of one frame output from the output selection unit 237 to the respective input systems is displayed on the 4K-TV 310.

As described above, in the second operation, similarly to the first operation, the two display processing units 231 and 232 provided in the display processing device 23 and handling the display image data of the full HD size (1920×1080) perform the display processing for the left side display image data and the display processing for the right side display image data in cooperation with each other in a parallel manner, thereby performing the display processing for the display image data of the 4K2K size (3840×2160). Then, in the second operation, the output selection unit 237 provided in the display processing device 23 simultaneously outputs the display-processed output image data corresponding to the left half area and the display-processed output image data corresponding to the right half area to the respective input systems provided in the 4K-TV 310 connected to the display processing device 23 and corresponding to the image signal at the timing of the frequency corresponding to ½ of that of the display device clock with which the image of the 4K2K size (3840×2160) is displayed.

At this time, each of the display processing unit 231 and the display processing unit 232 operates with the operation clock of the frequency corresponding to ½ of that of the display device clock used to display the image of the 4K2K size (3840×2160). Furthermore, the output selection unit 237 also operates with the operation clock of the frequency corresponding to ½ of that of the display device clock used to display the image of the 4K2K size (3840×2160). That is, in the second operation in the display processing device 23, respective elements can operate with the operation clock of the frequency corresponding to ½ of that of the display device clock required when the 4K-TV 310 connected to the display processing device 23 displays an image corresponding to one pixel. In other words, in the second operation in the display processing device 23, the frequency of the operation clock of the respective elements is only caused to be twice that of the display device clock of the TV 31 that displays the image of the full HD size (1920×1080), so that it is possible to perform the display processing on the display image data of the 4K2K size (3840×2160) and the output of the display-processed output image data. In this way, in the display processing device 23, by the second operation, in the state in which the frequency of the operation clock is suppressed, it is possible to perform the display processing on a high definition image as compared with an image with a size handled by each of the display processing unit 231 and the display processing unit 232 provided in the display processing device 23.

In addition, in the second operation, the case in which the operation clock of the output selection unit 237 is an operation clock with the frequency corresponding to ½ of that of the display device clock used to display the image on the 4K-TV 310 has been described. However, in the second operation, similarly to the first operation, the operation clock of the output selection unit 237 may be set as the display device clock used to display the image on the 4K-TV 310. In this case, similarly to the first operation, the operation clock of the output selection unit 237 is a clock with a frequency four times that of the display device clock generated when the TV 31 is connected to the display processing device 23. However, next output image data is not stored (written) by the memory writing control unit 235, that is, overwriting is not performed, before the output image data stored in the line memory 236 is read by the output selection unit 237. In this way, a configuration for preventing the overwriting is considered unnecessary in the line memory 236.

According to the present embodiment, a display processing device (the display processing device 23) performs predetermined display processing on image data (display image data) of a display image of a predetermined first size (for example, the full HD size (1920×1080)) input to the display processing device 23, and includes: a first display processing unit (the display processing unit 231) that divides a display image of a second size (for example, the 4K2K size (3840×2160)) larger than, for example, the full HD size (1920×1080) into a first area and a second area (a left half area and a right half area) and outputs image data (output image data obtained by performing the display processing on left side display image data) of a first output image obtained by performing the display processing on display image data (the left side display image data) of the first area (the left half area), when the display image of the second size is input to the display processing unit 231; a second display processing unit (the display processing unit 232) that outputs image data (output image data obtained by performing the display processing on right side display image data) of a second output image obtained by performing the display processing on display image data (the right side display image data) of the second area (the right half area); a storage unit (the line memory 236) that temporarily stores the output image data obtained by performing the display processing on the left side display image data and the output image data obtained by performing the display processing on the right side display image data; a memory writing control unit (the memory writing control unit 235) that controls writing to the line memory 236 of the output image data obtained by performing the display processing on the left side display image data and the output image data obtained by performing the display processing on the right side display image data; an output selection unit (the output selection unit 237) that reads the output image data obtained by performing the display processing on the left side display image data stored in the line memory 236 and the output image data obtained by performing the display processing on the right side display image data stored in the line memory 236, and outputs the read output image data to a first display device (for example, the 4K-TV 310) that displays an image of for example, the 4K2K size (3840×2160); and a clock control unit (the clock control unit 234) that generates and supplies an operation clock required when the display processing unit 231, the display processing unit 232, and the memory writing control unit 235 operate.

Furthermore, according to the present embodiment, in the display processing device 23, the display processing unit 231 acquires the left side display image data of the left half area by the DMA and notifies the display processing unit 232 of a timing at which the right side display image data of the right half area is acquired by the DMA.

Furthermore, according to the present embodiment, in the display processing device 23, the display processing unit 231 includes: a first synchronization signal generation block (the synchronization signal generation block 2311) that generates and outputs a synchronization signal (for example, a vertical synchronization signal V or a horizontal synchronization signal H) required when, for example, the 4K-TV 310 displays an image corresponding to output image data output from the output selection unit 237, and generates and outputs a first trigger signal (the trigger signal TG1) representing a first timing at which acquisition of the left side display image data of the left half area by the DMA is started and a second trigger signal (the trigger signal TG1*a*) representing a second timing at which acquisition of the right side display image data of the right half area by the DMA is started, on the basis of the operation clock supplied from the clock control unit 234; a first input control block (the input control block 2312) that acquires the left side display image data of the left half area by the DMA in response to the trigger signal TG1; and a first display processing block (the display processing block 2313) that outputs the image data (the output image data obtained by performing the display processing on the left side display image data) of the first output image obtained by performing the display processing on the left side display image data of the left half area acquired by the input control block 2312. The display processing unit 232 includes: a second synchronization signal generation block (the synchronization signal generation block 2321) that generates and outputs a synchronization signal required when a second display device (for example, the TV 31, the EVF 32, the TFT-LCD 33, and the like), which is handled by the display processing unit 232 independently, displays an image corresponding to output image data output from the display processing unit 232, and generates and outputs a third trigger signal (the trigger signal TG2) representing a third timing at which acquisition of the image data (display image data) of a display image of, for example, the full HD size (1920×1080), which is handled by the display processing unit 232 independently, by the DMA is started, on the basis of the operation clock supplied from the clock control unit 234; a synchronization signal selection block (the synchronization signal selection block 2324) that selects any one of the trigger signal TG1a and the trigger signal TG2 and outputs the selected trigger signal as a fourth trigger signal (the trigger signal TG); a second input control block (the input control block 2322) that acquires the right side display image data of the right half area or the image data (the display image data) of the display image of for example, the full HD size (1920×1080) which is handled by the display processing unit 232 independently, by the DMA in response to the trigger signal TG; and a second display processing block (the display processing block 2323) that outputs the right side display image data of the right half area acquired by the input control block 2322, or the image data (output image data) of the second output image obtained by performing the display processing on the image data (the display image data) of the display image of, for example, the full HD size (1920×1080), which is handled by the display processing unit 232 independently.

Furthermore, according to the present embodiment, in the display processing device 23, the line memory 236 includes a first storage area (the left side storage area) that stores the output image data obtained by performing the display processing on the left side display image data, and a second storage area (the right side storage area) that stores the output image data obtained by performing the display processing on the right side display image data. On the basis of the synchronization signal output by the display processing unit 231 and corresponding to, for example, the 4K-TV 310, the memory writing control unit 235 controls writing to the left side storage area of the output image data obtained by performing the display processing on the left side display image data and writing to the right side storage area of the output image data obtained by performing the display processing on the right side display image data output by the display processing unit 232 when the trigger signal TG1a has been selected.

Furthermore, according to the present embodiment, in the display processing device 23, on the basis of the synchronization signal output by the display processing unit 231 and corresponding to, for example, the 4K-TV 310, the output selection unit 237 reads the output image data obtained by performing the display processing on the left side display image data stored in the line memory 236 and subsequently reads the output image data obtained by performing the display processing on the right side display image data, and outputs the read output image data to, for example, the 4K-TV 310.

Furthermore, according to the present embodiment, in the display processing device 23, on the basis of the synchronization signal output, by the display processing unit 231 and corresponding to, for example, the 4K-TV 310, the output selection unit 237 simultaneously reads the output image data obtained by performing the display processing on the left side display image data stored in the line memory 236 and the output image data obtained by performing the display processing on the right side display image data stored in the line memory 236, and outputs the read output image data to corresponding respective input systems provided in, for example, the 4K-TV 310.

Furthermore, according to the present embodiment, in the display processing device 23, the clock control unit 234 generates a clock (a display device clock, a so-called a pixel clock) of a frequency required when, for example, the 4K-TV 310 displays an image corresponding to one pixel, and generates the operation clock on the basis of the generated display device clock.

Furthermore, according to the present embodiment, in the display processing device 23, the line memory 236 is a line memory including storage areas that store output image data corresponding to one row (line) of the display image of, for example, the 4K2K size (3840×2160).

Furthermore, according to the present embodiment, in the display processing device 23, the first area is a left half area of the display image of, for example, the 4K2K size (340× 2160). The second area is a right half area of the display image of, for example, the 4K2K size (3840>2160). The display processing unit 231 outputs the output image data obtained by performing the display processing on the left side display image data of the left half area. The display processing unit 232 outputs the output image data obtained by performing the display processing on the right side display image data of the right half area.

Furthermore, according to the present embodiment, an imaging apparatus (the imaging apparatus 1 or the system of the imaging apparatus 1) includes the display processing device (the display processing device 23).

As described above, according to the embodiment of the present invention, when a display device that displays an image with higher definition than an image of a size handled by a display processing unit provided in the display processing device is connected, a plurality of display processing units provided in the display processing device operate in cooperation with each other in a parallel manner. In this way, in the embodiment of the present invention, it is possible to perform the display processing on a high definition image on which each display processing unit provided in the display processing device is not able to independently perform the display processing. Furthermore, in the embodiment of the present invention, it is possible to output the display-processed output image data without depending on the image signal input system provided in the connected display device.

Furthermore, in the embodiment of the present invention, the frequency of an operation clock of each display processing unit provided in the display processing device can be reduced as compared with the frequency of a clock (in the embodiment, a display device clock, a so-called a pixel clock) when a connected display device that displays a high definition image displays an image. In this way, in the embodiment of the present invention, even when the display device that displays a high definition image is connected, it is possible to limit an increase in the power consumption of the display processing device.

In addition, in the present embodiment, the case in which two display processing units 230) (the display processing unit 231 and the display processing unit 232) provided in the display processing device 23 operate in cooperation with each other in a parallel manner has been described. Therefore, in the present embodiment, the case in which, after the area of the display image data to be displayed on the 4K-TV 310 that displays the image of the 4K2K size (3840×2160) is divided into two right and left areas, the display processing unit 231 performs the display processing on the display image data of the left half area, and the display processing unit 232 performs the display processing on the display image data of the right half area has been described. Accordingly, in the present embodiment, it has been described that the operation clock of each of the display processing unit 231, the display processing unit 232, and the memory writing control unit 235 provided in the display processing device 23 is the clock of the frequency corresponding to ½ of the frequency of the display device clock used to display the image on the 4K-TV 310. However, the number of display processing units 230 operating in cooperation with each other in a parallel manner is not limited to the embodiment of the present invention, and many more display processing units 230 can be configured to operate in cooperation with each other in a parallel manner.

For example, four display processing units 230 provided in the display processing device can also be configured to operate in cooperation with each other in a parallel manner. In such a configuration, when the image of the 4K2K size (3840>2160) is displayed on the 4K-TV 310, the area of the display image data of the 4K2K size (3840×2160) is divided into four areas, and each of the four display processing units 230 operating in cooperation with each other in a parallel manner can perform the display processing on the display image data of the divided each area. In this case, the frequency of the operation clock of each of the display processing units 230 and the memory writing control unit 235 provided in the display processing device 23 can be set to ¼ of the frequency of the display device clock used to display an image on the 4K-TV 310. That is, in the embodiment of the present invention, the number of divisions of the display image data to be subjected to the display processing is increased in response to the number of display processing units operating in cooperation with each other in a parallel manner, so that it is possible to suppress the frequency of the operation clock of the elements provided in the display processing device, that is, to a frequency of (1/the number of display processing units).

In this case, among the four display processing units 230, one display processing unit 230 is configured to output the trigger signal TG1a representing the start timing of the DMA similarly to the aforementioned display processing unit 231, and the other three display processing units 230 are configured to acquire corresponding display image data in response to the trigger signal TG1a similarly to the aforementioned display processing unit 232. Furthermore, the storage area of the line memory provided in the display processing device is configured to be divided to correspond to the respective display processing units operating in cooperation with each other in a parallel manner. That is, the storage area of the line memory is configured to be divided by the number of display processing units operating in cooperation with each other in a parallel manner. Furthermore, the output selection unit provided in the display processing device is configured to read and output the display-processed output image data stored in each storage area of the line memory, in response to the number of image signal input systems provided in the display device connected to the display processing device.

Furthermore, in the present embodiment, the configuration in which the input control block of each display processing unit 230 provided in the display processing device 23 adjusts the timing at which each display processing unit 230 outputs the display-processed output image data has been described. However, the timing at which each of the display processing unit 231 and the display processing unit 232 outputs the display-processed output image data need not be completely synchronized. That is, when the display processing corresponding to one line ends in a period of the same horizontal synchronization signal H (the same horizontal period), the timing at which each display processing unit 230 performs the display processing may be shifted. That is, in the display processing device 23, the timing at which each of the display processing unit 231 and the display processing unit 232 performs the display processing can be permitted if it is shifted in the horizontal blanking period. Therefore, for example, it is possible to more simply control the timing at which the synchronization signal generation block 2311 in the display processing unit 231 outputs the trigger signal TG1a for causing the display processing unit 232 operating in cooperation to start the DMA.

Furthermore, in the present embodiment, the configuration in which the memory writing control unit 235 provided in the display processing device 23 performs the control of storing (writing) the output image data obtained by performing the display processing by the two display processing units 230 (the display processing unit 231 and the display processing unit 232) in the line memory 236 has been described. However, the control of storing (writing) the output image data obtained by performing the display processing by each of the display processing unit 231 and the display processing unit 232 in the line memory 236 is not limited to the embodiment of the present invention. For example, each of the display processing unit 231 and the display processing unit 232 can be configured to perform the control of storing (writing) the display-processed output image data in a corresponding storage area of the line memory 236. In this configuration, for example, the memory writing control unit 235 may not be provided in the display processing device 23.

Furthermore, in the present embodiment, the case in which the two display processing units 230 (the display processing unit 231 and the display processing unit 232) provided in the display processing device 23 operate in cooperation with each other in a parallel manner, thereby handling the display device that displays the (high definition) image of the 4K2K size (3840×2160) larger than the image of the corresponding full HD size (1920×1080) handled by each display processing unit 230, has been described. However, the size of an image that can be handled by a plurality of display processing units 230 provided in the display processing device and operating in cooperation with each other in a parallel manner, is not limited to the embodiment of the present invention. That is, the concept of the present invention is applied in response to the configuration of the display processing unit 230 provided in the display processing device, so that it is possible to construct a configuration in which the display processing is performed on the high definition image, that is, an image with a larger size titan the image of the 4K2K size (3840×2160).

Furthermore, in the present embodiment, a configuration of switching the first operation and the second operation in the display processing device 23 is not particularly specified. It may also be possible to employ a configuration in which the switching of the first operation and the second operation in the display processing device 23 is performed by, for example, a control unit (not shown) for controlling the entire imaging apparatus 1 employing the display processing device 23 according to the present embodiment, or a control unit (not shown) for controlling the entire image processing apparatus 20 mounted in the imaging apparatus 1 and including the display processing device 23 according to the present embodiment.

Furthermore, in the present embodiment, respective areas obtained by dividing the area of the display image data are not particularly specified. The respective areas obtained by dividing the area of the display image data are not only obtained through simple area division, but also, for example, so-called overlapping areas, in which the boundary portions of the divided respective areas overlap each other, can be provided. By providing the overlapping areas, even when the display processing has been separately performed on the display image data of respective divided areas, it is possible for joints of respective divided areas in an image corresponding to display-processed output image data displayed on a display device to be less conspicuous.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display processing device that performs predetermined display processing on image data of a display image of a predetermined first size, the image data of the display image of the first size being input to the display processing device, the display processing device comprising:
   a first display processing unit that divides a display image of a second size larger than the first size into a first area and a second area and outputs image data of a first output image obtained by performing the display processing on display image data of the first area, when the display image of the second size is input to the first display processing unit;
   a second display processing unit that outputs image data of a second output image obtained by performing the display processing on display image data of the second area;
   a storage unit that temporarily stores the image data of the first output image and the image data of the second output image;
   a memory writing control unit that controls writing of the image data of the first output image and the image data of the second output image to the storage unit;
   an output selection unit that reads the image data of the first output image and the image data of the second output image stored in the storage unit, and outputs the image data of the first output image and the image data of the second output image to a first display device that displays the display image of the second size; and
   a clock control unit that generates and supplies an operation clock required when the first display processing unit, the second display processing unit, and the memory writing control unit operate.

2. The display processing device according to claim 1, wherein the first display processing unit acquires the display image data of the first area by a direct memory access (DMA) and notifies the second display processing unit of a timing at which the display image data of the second area is acquired by the DMA.

3. The display processing device according to claim 1, wherein
   the first display processing unit includes:
      a first synchronization signal generation block that generates and outputs a synchronization signal required when the first display device displays an image corresponding to output image data output from the output selection unit, and generates and outputs a first trigger signal representing a first timing at which acquisition of the display image data of the first area by the DMA is started and a second trigger signal representing a second timing at which acquisition of the display image data of the second area by the DMA is started, on the basis of the operation clock supplied from the clock control unit;
      a first input control block that acquires the display image data of the first area by the DMA in response to the first trigger signal; and
      a first display processing block that outputs the image data of the first output image obtained by performing the display processing on the display image data of the first area acquired by the first input control block, and
   the second display processing unit includes:
      a second synchronization signal generation block that generates and outputs a synchronization signal required when a second display device, which is handled by the second display processing unit independently, displays an image corresponding to output image data output from the second display processing unit, and generates and outputs a third trigger signal representing a third timing at which acquisition of the image data of the display image of the first size, which is handled by the second display processing unit independently, by the DMA is started, on the basis of the operation clock supplied from the clock control unit;
      a synchronization signal selection block that selects any one of the second trigger signal and the third trigger signal and outputs the selected trigger signal as a fourth trigger signal;
      a second input control block that acquires the display image data of the second area or the image data of the display image of the first size, which is handled by the second display processing unit independently, by the DMA in response to the fourth trigger signal; and
      a second display processing block that outputs the display image data of the second area acquired by the second input control block, or the image data of the second output image obtained by performing the display processing on the image data of the display image of the first size, which is handled by the second display processing unit independently.

4. The display processing device according to claim 3, wherein
the storage unit includes a first storage area that stores the image data of the first output image and a second storage area that stores the image data of the second output image, and
the memory writing control unit controls writing to the first storage area of the image data of the first output image and writing to the second storage area of the image data of the second output image output by the second display processing unit when the second trigger signal is selected, on the basis of the synchronization signal output by the first display processing unit and corresponding to the first display device.

5. The display processing device according to claim 3, wherein, on the basis of the synchronization signal output by the first display processing unit and corresponding to the first display device, the output selection unit reads the image data of the first output image stored in the storage unit and subsequently reads the image data of the second output image, and outputs the read image data to the first display device.

6. The display processing device according to claim 3, wherein, on the basis of the synchronization signal output by the first display processing unit and corresponding to the first display device, the output selection unit simultaneously reads the image data of the first output image stored in the storage unit and the image data of the second output image, and outputs the read image data to each corresponding input system provided in the first display device.

7. The display processing device according to claim 1, wherein the clock control unit generates a clock of a frequency required when the first display device displays an image corresponding to one pixel, and generates the operation clock on the basis of the generated clock.

8. The display processing device according to claim 1, wherein the storage unit is a line memory including a storage area that stores image data corresponding to one row of the display image of the second size.

9. The display processing device according to claim 1, wherein
the first area is a left half area of the display image of the second size,
the second area is a right half area of the display image of the second size,
the first display processing unit outputs the image data of the first output image obtained by performing the display processing on display image data of the left half area, and
the second display processing unit outputs the image data of the second output image obtained by performing the display processing on display image data of the right half area.

10. An imaging apparatus including the display processing device according to claim 1.

* * * * *